United States Patent [19]

Sun et al.

[11] Patent Number: 5,435,893

[45] Date of Patent: Jul. 25, 1995

[54] PROCESS FOR THE DEWATERING OF PHOSPHATE SLIMES

[76] Inventors: Fuhua Sun, Michael Mok, c/o Fuhua Sun 32 Lewiston St., Staten Island, N.Y. 10314; Chunjie Zhang, 2416 Bradley Ave., #2, Louisville, Ky. 40217

[21] Appl. No.: 161,933

[22] Filed: Dec. 3, 1993

[51] Int. Cl.⁶ .......................................... B01D 61/56
[52] U.S. Cl. .................. 204/130; 204/182.2
[58] Field of Search ............................. 204/182.2, 130

[56] References Cited

U.S. PATENT DOCUMENTS

| | | | |
|---|---|---|---|
| 4,244,804 | 1/1981 | Moeglich | 204/300 R |
| 4,323,445 | 4/1987 | Alekhin et al. | 204/300 R |
| 4,808,304 | 2/1989 | Deal | 210/170 |
| 4,915,846 | 4/1990 | Thomas, Jr. et al. | 210/702 |

Primary Examiner—John Niebling
Assistant Examiner—Arun S. Phasge
Attorney, Agent, or Firm—Scott R. Cox

[57] ABSTRACT

The process for electro-sedimentation, dewatering and consolidation of Florida phosphate slime by the process of placing an anode at the bottom of a holding facility for the storage of the phosphate slime; filling the holding facility with phosphate slime; placing a cathode on the surface of the solid portion of the phosphate slime but below the surface of any supernatant liquid; applying an electrical current to the cathode to produce a separation of the phosphate clays from the phosphate slime and draining off any decanted water to produce phosphate slimes with a solid content of at least about 15 percent.

8 Claims, 2 Drawing Sheets

PROCESS FOR THE DEWATERING OF PHOSPHATE SLIMES

BACKGROUND OF THE INVENTION

1. Field of Invention

This invention relates to processes for the dewatering of phosphate slimes. More specifically, this invention relates to an electro-sedimentation process for the dewatering of phosphate slimes.

2. Prior Art

The main commercial source for the production of phosphates and phosphorus is phosphate rock which is largely apatite. During the mining and processing of phosphate rock a residual material known as phosphate slime is commonly produced. It is an aqueous suspension or gel of insoluble phosphate rock, phosphate clay and/or apatite in water. Because of its collodial nature which makes filtration impossible, it cannot be treated by ordinary procedures to recover the phosphates contained therein. It is necessary to store such slimes in settling ponds because no other means of disposition of this material is commercially feasible.

The problem of dewatering phosphate slimes, slurries and muds is especially troublesome because the slimes generally fail to settle out principally because of the small size of the particulate material. Because of the hydrophilic nature of the phosphate slime, the solid content of the slime, even if placed in a settling pond for considerable periods of time, rarely rises above 10 to 15%. Further, these settling ponds are unattractive and hazardous and take land out of productive use. In addition, they retain water which is often used in the mining operation and require maintenance of the walls of the ponds to prevent breaches in the ponds which would allow the escape of the slime. Use of these large settling ponds has been a subject of great concern, particularly in the State of Florida, where hundreds of thousands of acres of otherwise productive land have been more or less permanently converted to slime disposal areas with thousands of additional acres of land being converted each year. This represents a tremendous loss in land, water and minerals for the state.

When created the slime in the settling ponds has a solid content of only about 3 to 5% and takes about six months to settle to a solid content of as much as 15%. In view of the above, it is clear that there is a significant need for improved processes for the dewatering of slimes to convert them into potentially useful products and to return the land to a more productive use.

Numerous efforts and proposals have been offered to improve the rate of dewatering phosphate slimes, including at least the following:

(a) The U.S. Bureau of Mines has been active in this field, see reports R17892, 8089, 8498 and 6451.
(b) Dr. Henry L. Barwood et al of the Florida Phosphate Research Institute has published a draft entitled "Phosphate Clay Waste Bibliography."
(c) Leslie G. Bromwell et al of the Florida Phosphate Clays Research Project has extensively researched the subject, see pages 541–558 of an article entitled "Waste Clay Dewatering and Disposal."
(d) An overview of the subject appears in the November 1977 issue of World Mining, pages 62–64.
(e) Stanczyk, MH, Feld, I. L., Electro-dewatering Tests of Florida Phosphate Rock Slime, U.S. Dept. of the Interior, Bureau of Mines (1964).
(f) McKean, J. E.; ECOPAC Field Test in Florida Phosphate Slime Pond, Monsanto Enviro-Chem (Jan. 21, 1986).
(g) El-Shell, H. E.; Beneficiation Research - Clay Disposal.

A number of patents have also disclosed attempts to resolve this problem, including U.S. Patent Nos. 3,450,633; 3,680,698; 3,761,239; 3,763,041; 4,000,067; 4,107,026; 4,155,233; 4,194,960; 4,217,212; 4,229,293; 4,330,685; 4,563,285; 4,608,179 and 4,808,304. See also British Patent No. 1,466,185. See also Development of Alternatives for Dewatering Dredged Material, Halibarton, pages 615–631.

In particular, U.S. Patent No. 4,808,304 discloses an apparatus for the dewatering of phosphate slime using a closed loop system incorporating an electrokinetic densification of the dredged material. While U.S. Pat. No. 4,808,304 utilizes an electrokinetic process for the dewatering of phosphate slime, the cost of the electricity used in this process is prohibitive and the solid content of the material produced is still not greater than about 14 to 18%.

Therefore, it is an object of this invention to provide an improved process for the dewatering of phosphate slimes.

It is another object of this invention to provide an improved process for the dewatering of phosphates using an improved electro-sedimentation process.

It is a still further object of this invention to provide an improved process for the dewatering of phosphate slimes where electrical energy is used, utilizing different electrical wave forms.

These and other objects and features of this present invention will become apparent to those skilled in the art from a consideration of the following detailed description, drawings and claims. The description along with accompanying drawings provides a selected example of construction of the device to illustrate the invention.

SUMMARY OF THE INVENTION

In accordance with the present invention there is provided a process for the dewatering of phosphate slimes to produce a solid content of at least about 15% by the process of (1) Placing an anode at the bottom of a holding facility for the holding of the phosphate slime;
(2) Filling the holding facility with phosphate slime;
(3) Placing a cathode on the surface of the phosphate slime but below the surface of any supernatant water such that said cathode retains contact with the phosphate slime; and
(4) Applying a sufficient electrical current to the cathode to produce a partial separation of clay particles contained within the phosphate slime from liquid to produce an improved phosphate slime with a solid content of at least about 15%.

BRIEF DESCRIPTION OF THE DRAWINGS

This invention will now be described with reference to the accompanying drawing in which.

DETAILED DESCRIPTION OF THE PREFERRED EMBODIMENT

Figure 1:
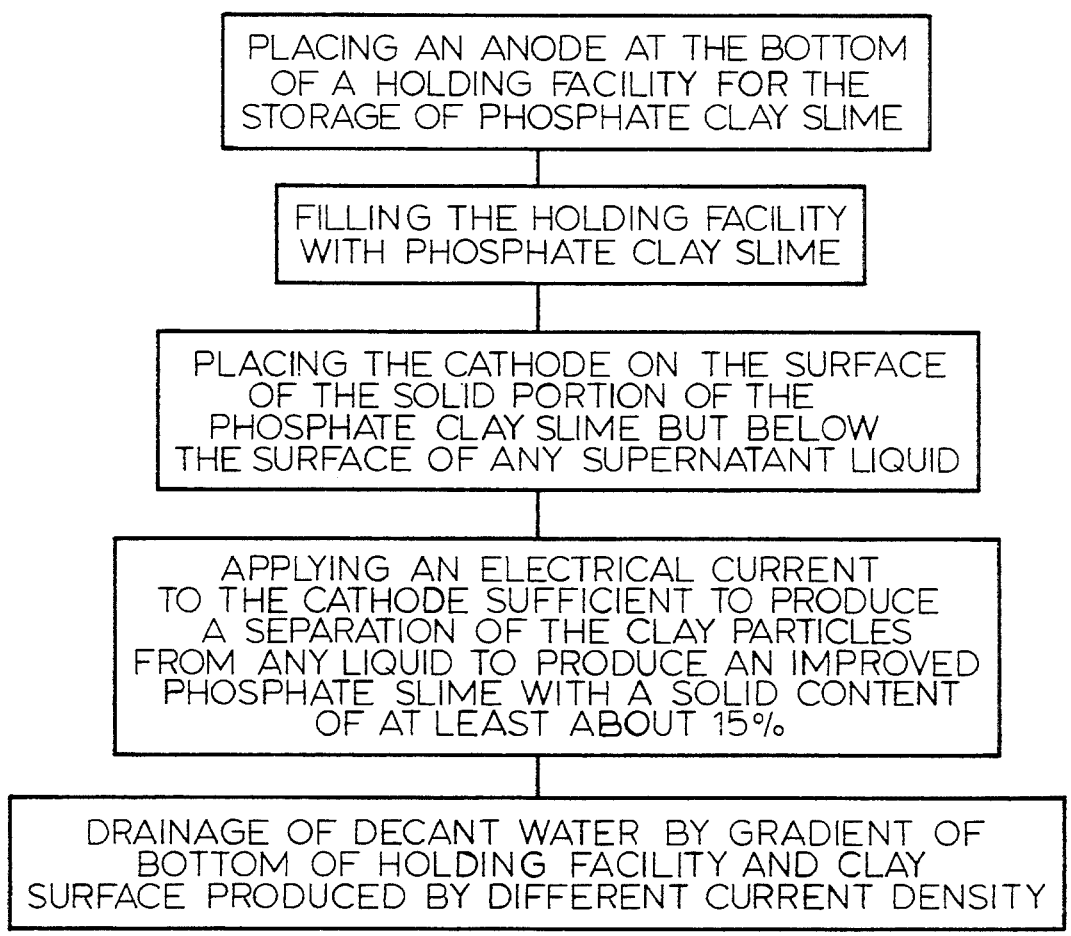
FIG. 1 is a block diagram showing the process of the instant invention.

Although the invention is adaptable to a wide variety of uses, it is shown in the drawings and in the description for purpose of illustration as embodied in a process for the dewatering of phosphate slime from a mining operation to produce a slime with a solid content of at least about 15% by placing an anode at the bottom of a holding facility for the storage of the phosphate slime; filling the holding facility with phosphate slime material from the mining operation; placing a cathode on the surface of the phosphate slime, but below the surface of any supernatant liquid; and applying an electrical current to the cathode for a sufficient period of time at a sufficient current density to produce a separation of clay materials contained within the phosphate slime from water to produce an improved phosphate clay product with a solid content of at least 15%. See FIG. 1.

Florida phosphate clays contained in phosphate slimes are electro-sensitive. Accordingly, some electro-dewatering methods have been tested for the separation of water from the phosphate slime but these methods have not proved economical. Generally, these methods were based on theories of electrophoresis or electroosmosis. In these methods, the configuration of the dewatering system is horizontal, that is, the anode and cathode were the same level and water moved toward the cathode horizontally.

In the process of the instant invention the anode is placed in a generally horizontal position with a slight gradient for drainage of decant water, preferably at the bottom of a holding facility for the phosphate slime. The anode is preferably comprised of a metal sheet, preferably of iron or steel, placed over the bottom surface of the holding facility. The thickness of the anode is preferably from about 0.5 mm. to about 6.0 mm. In one preferred embodiment the anode is comprised of common steel plates that are welded together. The anodes are preferably placed directly on the bottom of the holding facility.

The holding facility is generally designed for both dewatering and consolidation of the material. When the phosphate slime contained within the holding facility has been effectively dewatered, it is removed by mechanical means and then the facility is refilled with new phosphate slime to begin a new dewatering cycle. The size of the holding facility will vary depending upon the operator of such facility and on practical considerations such as the mechanical means for input of the phosphate slime and removal of the dewatered phosphate slime. For example, in a preferred embodiment the size of the facility can be approximately 3 to 4 meters in width and 20 to 30 meters in length and about 2 meters in depth. This would permit the facility to hold somewhere in the range of about 200 tons of phosphate slime at one time.

Once the anode has been placed at the bottom of the holding facility, the facility is filled with conventional phosphate slimes from a mining operation containing the usual low percentages of clay. Conventionally these phosphate slimes initially have a phosphate clay content of as low as about 3%. Many types of clays may be present in the phosphate slime but, generally speaking, these clays are electro-sensitive, resulting in significant separation of the clay from the water by use of the instant process. The general composition of phosphate slimes include carbonate-fluorapatite, quartz, montmarillonite, attapulgite, wavellite, feldspar, heavy minerals such as zircon, garnet, ilmenite and rutite, dolomite and miscellaneous materials such as kaolinite, guandallite, hydrated ironoxide, and organic material. The depth of the facility is not particularly critical to the process. However, the depth of the facility is important from an energy consumption view. The shallower the facility, the more efficient the system will be in the dewatering of the phosphate slime. However, from a practical standpoint, facilities with phosphate slime less than about 1 meter are not practical. Preferably the depth of the facility should be from about 1.0 to about 2.0 meters.

Figure 2A:
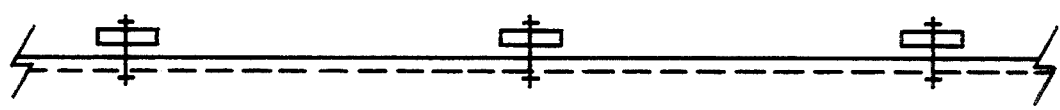
FIG. 2A is a side view of an example of the structure of the cathode.
Figure 2:
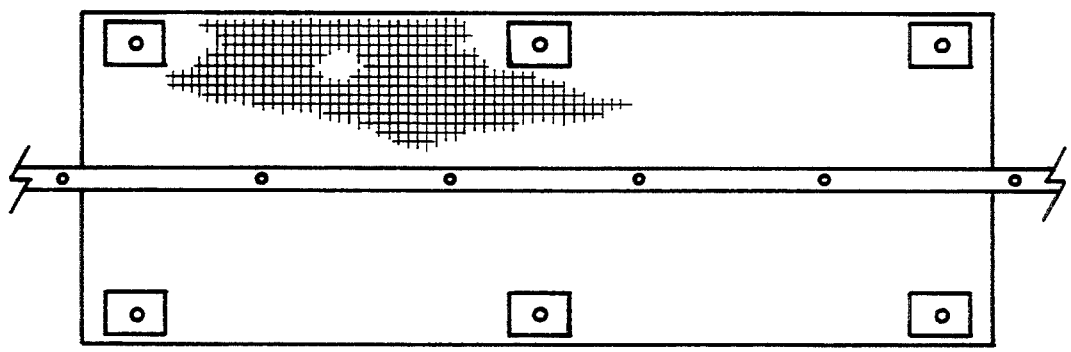
FIG. 2 is a top view of an example of the structure of the cathode.

Once the phosphate slime has been placed within the holding facility, the cathode is placed at the surface of the phosphate slime but below the surface of any supernatant water. In prior art processes for the electro-separation of clays in phosphate slimes, the cathode has been designed to float on the surface of the water but above the surface of the slime material. See, for example, U.S. Pat. No. 4,808,304. It has been discovered that when the cathode is located at the surface of the supernatant liquid, lower dewatering rates occur as well as higher energy consumption. This is principally because the conductivity of the slime is higher than that of the supernatent water itself. Further, lower solid contents are produced from the phosphate slimes when the process is used. Thus, it is critical to the process that the cathode be sunk through any decanted water layer and be placed at the interface between the water and the phosphate slime with the cathode actually touching the surface of the phosphate slime. Preferably, the cathode is a screen type material with openings of at least several millimeters square. Preferably the thickness of the screen is about 2 to 3 millimeters. Preferably the screen covers the entire settling pond for the most efficient dewatering of the phosphate slime. The metal used for the cathode can be of any conventional cathode material such as copper or steel with zinc coating. Preferably the screen is roll spread onto the surface of the slime material. To assure that the cathode is placed at the appropriate demarkation line between the supernatant liquid and the phosphate slime, a specific gravity adjuster is secured to the surface of the cathode to hold it in place. Any conventional mechanism can be utilized for this adjuster. In one embodiment, the specific gravity adjuster is made of a hollow plastic or foam material which will adjust the specific gravity of the cathode to between one and the specific gravity of the phosphate slime material so that the cathode can sink through the supernatant liquid but not significantly sink into the slime material, especially at the beginning of the electro-sedimentation process. The specific construction of the specific gravity adjuster is not particularly critical as long as it results in the combination hollow plastic and cathode having a specific gravity slightly greater than 1.0. As the cathode metal screen has a specific gravity of about 7 to 8 and the floating material made of foam or hollow plastic has specific gravity significantly less than 1, the combination of these two can be readily adjusted to create a combination having a specific gravity slightly greater than 1. The particular choice as to construction is not critical. However, what is critical is that the cathodes sink through the supernatant liquid to rest on or slightly below the surface of the phosphate slime material. When the solid content of the phosphate slime rises to a level of about 20% solid, the cathode will be supported by the phosphate slime itself. The weight of the cathode is generally sufficient itself to force the cathode to touch the surface of the phosphate slime. An example of the structure of the cathode is shown in FIGS. 2 and 2A.

While the process of the dewatering of slime using an electro-sedimentation process is not necessarily well understood from a chemical standpoint, it appears that the electrical current flowing through the phosphate slime destroys the bond between the clay particles and the water and, thus, results in the solid clay particles sinking and the water decanting toward the surface of the holding facility.

To continue the efficient separation of the water, it is important that the decanted water be drained off as the process continues. To achieve this goal it may be necessary to adjust the intensity of the current at different locations throughout the facility so that a gradient can be produced resulting in a faster dewatering rate near that portion of the facility where the liquid drains out and a slower dewatering at locations distant from the drainage location. The appropriate range of current density is from about 0.1 ma/cm$^2$ to 0.8 ma/cm$^2$. These differences in current density can be applied at different locations across a settling pond to result in different sedimentation rates as desired. As previously stated, the greater current should be applied near where the liquid drains out of the facility to enhance the dewatering process.

The application of the electrical current to the phosphate slime is best done by the use of direct current. The method of connection of the electrical current to the cathode is not particularly critical and does not require special methods of adjustment. Common electrical systems are used to connect the electrical source to the cathode. Sources are preferably direct current sources according to the requirements of the individual operator. Common electrical equipment is used for the creation and transmission of the direct current. Rectifiers and modifiers can be added to the electrical source so that the amount of current can be closely monitored and adjusted to control the rate of separation.

In addition, it has been discovered that the wave form of the electrical current is important to the electro-sedimentation process. The specific type of wave form used will depend on the type of clay that is being dewatered. Optimum dewatering processes for specific types of phosphate slime can best be determined by testing at a particular location. For example, a wave form may be a full wave with a single or multi-phases or with smoothed or non smoothed wave form; half wave with single or multi-phases or with smoothed or non-smoothed wave form; SCR phase controlled wave or frequency controlled or with controlled pulses. The specific choice of type of wave form will depend on the mixture of phosphate slime. It is best determined during an on site application.

In addition, current density is another important parameter to be adjusted in the electro-sedimentation process. The density can range from a low of 0.01 milliamps/cm$^2$ to as high as 100 milliamps/cm$^2$. Once again it has been discovered that additional thresholds of current density are site specific and may be adjusted for the particular type of clay being dewatered. Preferably the best current density for dewatering is from about 0.1 ma/cm$^2$ to about 1.0 ma/cm$^2$. Regardless, as the dewatering process occurs, the current density generally must be increased gradually to obtain higher solid content. For obtaining the preferred higher solid content of about 15% to about 25%, the current density is usually increased from about 0.2 ma/cm$^2$ to a density of no more than about 1.0 ma/cm$^2$. The overall output of current necessary to produce 1 ton of clay with solid content of about 15% to about 25% solid on a dry weight basis is about 40 to 50 kwh/ton, dry basis.

Once the solid content of a clay reaches 25% or higher, the clay will frequently secure itself to the surface of the anode and be difficult to remove. To remove the clay from the anode, making removal of the clay from the sedimentation facility more efficient, the polarity of the electrodes may be reversed, that is the anode is made negative and the cathode is made positive for a very short period of time to remove the clay easily from the anode.

Once the solid content reaches at least 18% or more, the solid can be more readily removed from the storage facility for use for land reformation and other common uses. In addition, as the solid content can be made 25% or even higher, it can the be more easily removed by conventional mechanical methods such as chain conveyors, belt conveyors and by trucking the material.

The water is removed from this facility by conventional means such as by use of a weir at the holding facility. As the water flows out of the facility it is collected and piped for reuse by conventional means.

In an alternative embodiment the anode can be the earth itself as a portion of a natural grounding system. In this system, a system of electrical earthing pipes are drilled into the earth vertically and connected by metal strips horizontally. The method of connecting the metal strips to the ground is conventional as is commonly used in earthing systems for electrical power supply systems. This system can be used in certain circumstances for the electro-sedimentation of the facility.

The following examples are provided to further illustrate the invention.

EXAMPLE 1

In Example 1, Florida Noralyn clays with initial solid content of 9% were used. The clays were put in about a 200 ml glass beaker (diameter=6.3 cm, height=7.0 cm). An iron sheet with 0.5 mm thickness was placed on the bottom of the beaker to act as the anode. A copper wire screen with 3 mm opening was placed at the top of the clay as a cathode. The electrodes were connected to an adapter which was hooked to an adjustable transformer. This transformer was directly plugged into a 120 V AC socket. The D.C. voltage and D.C. current applied to the electrodes were measured by a multitester. In this experiment, D.C. current of 2.4 V and 7.8 ma with half wave were applied for 98 hours. The average current density was 0.25 ma/cm$^2$. During the testing the cathode was kept in touch with the surface of clays and decanted water was drained manually. After 98 hour treatment, the wet clays were taken out and weighed. The weight of the wet clays was 68.2 gram. The wet clays then were put in an oven for drying until weight was constant. After cooling the dried clays were weighed again: the weight was 18.9 gram. Thus, the final solid content was calculated by $$\frac{\text{Dry clay weight}}{\text{Wet clay weight}} \times 100\%$$

In this test the final solid content of clays was 28%. Total energy consumption was 25.8 KWH/ton dry basis.

clay: Florida Noralyn primary washer clays, solid content 9%
test unit: 200 ml glass beaker
power: D.C. 2.4 V., half wave, 7.8 ma
test time: 98 hours
current density: 0.25 ma/cm$^2$
clay weight: wet: 68.2 gram; dry: 18.9 gram
final solid content: 28%
energy consumption: 25.8 KWH/ton dry basis

EXAMPLE 2

In this test, the same material was used as that in Example 1. The method and test material were also the same as those in Example 1. The differences between Example 1 and Example 2 were the current density and processing time. In test 2, D.C. power of 2.3 V and 12.0 ma current with a half wave were used for 40 hours. The average current density was 0.26 ma/cm$^2$. After 40 hour treatment, the weight of clays before and after drying was 44.1 gram and 12.6 gram, respectively. The final solid content of clays was 29% and total energy consumption was 48.8 KWH/ton dry basis.

clay: Florida Noralyn primary washer clays, solid content 9%
test unit: 200 ml beaker
power: D.C. 2.3 V., half wave, 12.0 ma
test time: 40 hours
current density: 0.26 ma/cm$^2$
clay weight: wet: 44.1 gram; dry: 12.6 gram
final solid content: 29%
energy consumption: 48.8 KWH/ton dry basis

EXAMPLE 3

Florida IMC phosphate clays with an initial solid content of 9% was used in this example. The clays were put in a 2000 ml normal plastic bottle with diameter 10.5 cm and height 18.0 cm. The height of clays at the beginning in the bottle was 17.0 cm. An iron screen with 6 mm opening was placed on the top of the clay to act as a cathode. The electrodes were connected to a SCR phase-controlled half-wave device which was hooked to an adjustable transformer. This transformer was directly plugged into a 120 V AC socket. The D.C. voltage and D.C. current applied to the electrodes were measured by a multitester. In this experiment, D.C. 7.2 V, half wave SCR phase-controlled, and 20.0 ma were applied to the clays for 44 hours. The average current density was 0.22 ma/cm$^2$. During the testing the cathode was kept in touch with the surface of clays and decanted water was drained manually. After 44 hour treatment, the clays were taken out and weighed. The weight of wet clays was 520 grams. After drying in an oven the dried clays weighed 150 grams. Thus, the final solid content of clays was calculated as in Example 1, at 29%. Total energy consumption was 52.6 KWH/ton dry basis.

clay: Florida IMC phosphatic clays, solid content 9%
test unit: plastic bottle, Diameter=10.5 cm, Height=18.0 cm
power: D.C. 7.2 V., half wave, SCR phase-controlled, 20.0 ma
test time: 44 hours
current density: 0.22 ma/cm$^2$
clay weight: wet: 520 gram; dry: 150 gram
final solid content: 29%
energy consumption: 52.6 KWH/ton dry basis

EXAMPLE 4

In this example the method and the test materials were the same as those in Example 3. In this test D.C. 10 V and 29 ma current with full-wave smoothed instead of half-wave SCR phase-controlled was applied to the clays. The average current density was 0.235 ma/cm$^2$. During the first 24 hour testing the cathode was kept in touch with the surface of clays and decant water was drained manually. After 24 hour treatment, a few gram clays were taken out to determine solid content at this time. The solid content after 24 hour treatment was 29% and energy consumption for 24 hours was 57.0 KWH/ton dry basis. When the solid content reached 29%, a 3 mm in diameter hole was drilled on the side wall of the bottle above the anode. This hole made drainage automatic. After 24 more hour treatment, the clays were taken out. The clays were divided into two parts: one was a core part and another was an annulus. The solid content of core part, which was 46% of total wet clays weight, was 39%. The average solid content of clays including core and annulus was 34%.

clay: Florida IMC phosphatic clays, solid content 9%
test unit: plastic bottle, Diameter=10.5 cm, Height=18.0 cm
power: D.C. 10.0 V., full wave smoothed, 29 ma
current density: 0.35 ma/cm$^2$
test time:
    24 hours solid content 29%
    48 hours average solid content 33.8% solid content in the core of clays (46% total weight) 39%
energy consumption: 57.0 KWH/ton dry basis (up to 24 hours)

We claim:
1. A process for the in situ dewatering of phosphate slime containing electrosensitive clays contained in a settling pond comprising the process of:
  (a) placing an anode at the bottom of the settling pond for the storage of the phosphate slime;
  (b) filling the settling pond with phosphate slime containing a solid portion of electrosensitive clays;
  (c) placing a cathode on the surface of the solid portion of phosphate slime but below the surface of any supernatant liquid contained in said phosphate slime;
  (d) applying an electrical current to the cathode to produce a separation of the solid portion of the electrosensitive clays contained within the phosphate slime from any liquid contained in the phosphate slime while maintaining contact between said cathode and the surface of the solid portion of the phosphate slime; and
  (e) draining off any decanted water to produce dewatered phosphate slimes with a solid content of at least about 15 percent.

2. The process of claim 1 wherein the current applied to produce the phosphate slime is a direct current.

3. The process of claim 2 wherein the current density of the current applied is from about 0.1 ma/cm$^2$ to about 1.0 ma/cm$^2$.

4. The process of claim 3 wherein different current densities are used depending upon the type of clay contained within the phosphate slime.

5. The process of claim 4 wherein the wave form for the current applied is adjusted, depending upon the nature of the clays contained within the phosphate slime.

6. The process of claim 1 wherein the anode is placed in a generally horizontal position with a slight gradient for drainage of any decanted water with the gradient formed by different current density.

7. The process of claim 1 wherein any dewatered slime affixed to the anode is substantially removed by reversing the polarity of the anode and cathode.

8. A process for in situ dewatering of phosphate slime containing electrosensitive clays contained in a settling pond comprising the process of:

(a) filling the settling pond for the storage of dewatered phosphate slime with phosphate slime containing a solid portion of electrosensitive clays;

(b) placing a cathode on the surface of the solid portion of phosphate slime but below the surface of any supernatant liquid contained in said phosphate slime;

(c) applying an electrical current to the cathode to produce a separation of the solid portion of the electrosensitive clays contained within the phosphate slime from any liquid contained in the phosphate slime while maintaining contact between said cathode and the surface of the solid portion of the phosphate slime; and (d) draining off any decanted water to produce dewatered phosphate slimes with a solid content of at least about 15 percent.

* * * * *